Nov. 17, 1925.
F. L. ANTISELL
APPARATUS FOR CONCENTRATING LIQUIDS
Filed Feb. 17, 1923
1,561,898
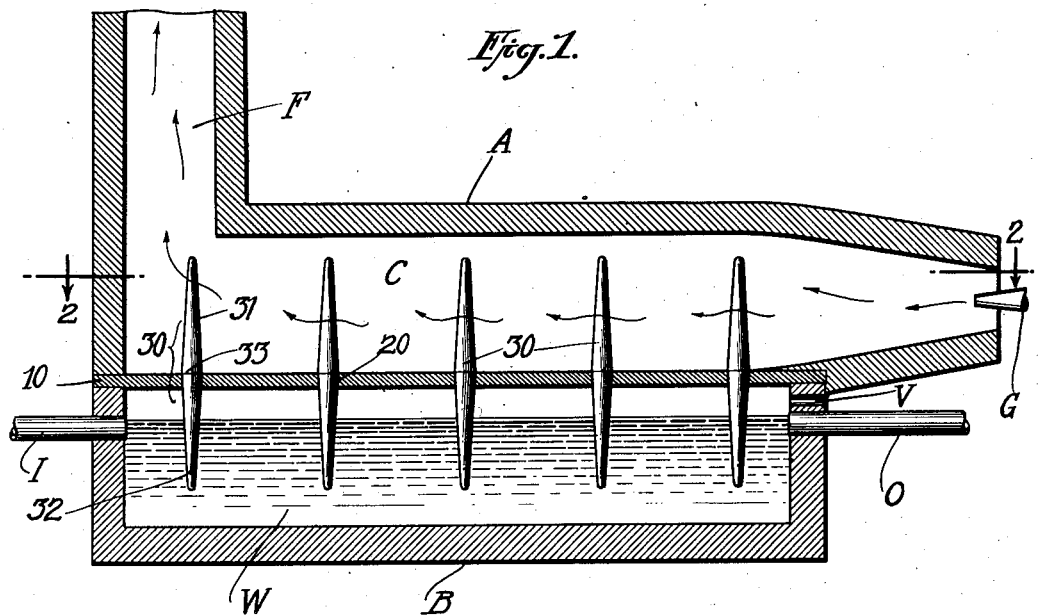
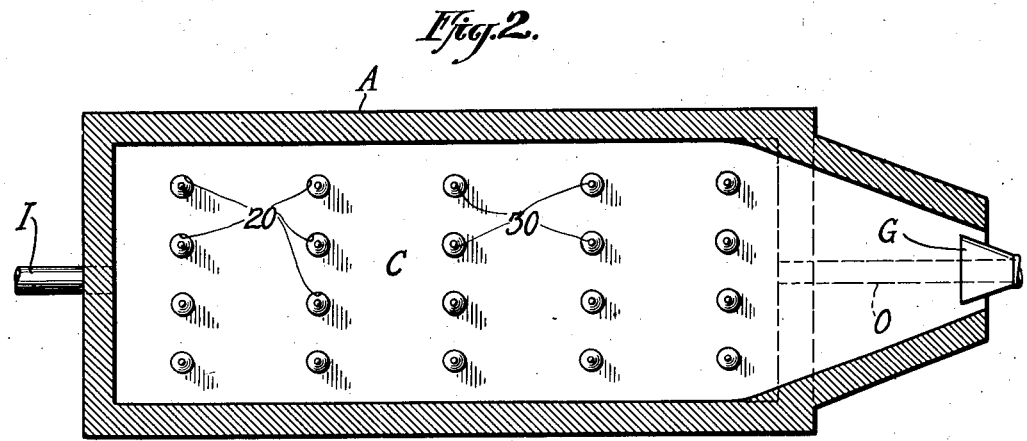
INVENTOR.
Frank L. Antisell.
BY
ATTORNEY.

Patented Nov. 17, 1925.

1,561,898

UNITED STATES PATENT OFFICE.

FRANK L. ANTISELL, OF PERTH AMBOY, NEW JERSEY.

APPARATUS FOR CONCENTRATING LIQUIDS.

Application filed February 17, 1923. Serial No. 619,618.

*To all whom it may concern:*

Be it known that I, FRANK L. ANTISELL, a citizen of the United States, and a resident of Perth Amboy, county of Middlesex, State of New Jersey, have invented certain new and useful Improvements in Apparatus for Concentrating Liquids, of which the following is a specification.

The apparatus is particularly adapted for the concentration by heat of solutions containing considerable solid matter; for the heating and evaporation of corrosive liquids which ordinarily cause rapid deterioration of tanks or cauldrons; and for the more efficient application of heat to water or chemical compounds which it is desired to evaporate, and it is the object of my invention to provide a heating apparatus which will afford the above named results.

Other objects will appear from the subjoined specification and claims.

In the drawings, which form a part of this specification:

Fig. 1 is a view of a heating apparatus embodying my invention.

Fig. 2 is a horizontal section on the line 2—2 of Fig. 1.

In the prior art when a solution containing considerable solid matter is heated the foreign substances in the solution collect into a substantially uniform deposit at the bottom of the tank. By reason of this fact a layer of the foreign substance will collect at the bottom of the tank and the tank will expand due to the excessive heat developed adjacent to the foreign matter. This results in cracking or warping of the material of the tank and even sometimes, in the burning out of the bottom of the tank or vessel containing the solution. It is therefore necessary to carry on with only a moderate heat for long periods of time in order to obtain results; consequently, to obtain quicker results large tanks are required which are costly to construct and these are operated with extremely poor efficiency.

I have discovered that it is possible to evaporate solutions in a vessel of non-heat conducting properties by introducing into the surface of the solution in the tank, downwardly projecting members or elements made from the best heat conducting material which will at the same time withstand the corrosive action of the solution to be heated. The apparatus invented by me is so constructed that the upper ends only of these heating members are brought into contact with the hot products of combustion of the furnace and the heat is then conducted downwardly through these projections into the solution.

The furnace structure consists of two parts A and B, each made of suitable material, such as masonry and fire brick, as well understood in the art, the two parts being divided by a cast iron plate 10. The part A of the structure is substantially rectangular in shape and is open at both ends so that any heat producing means, such as a burner G, can be inserted at one end, and the products of combustion are passed through the heating chamber C and up the flue F at the other end.

The part B is provided for holding the water W or solution to be heated and is provided with an inlet tube I and an outlet tube O therefor. A vent V is provided at the upper portion of the tank B through which vapors may escape, which vapors are caused by the heating of the liquid in the tank.

As stated above, the cast iron plate 10 is mounted between the parts A and B and separates the one from the other. This plate is provided with a series of holes 20, as shown in the drawing placed at substantially equal distances apart, the holes being provided with walls having the shape of a frustum of a cone. In these holes are placed rods 30, each rod being conically shaped at each end thereof at 31 and 32, the bases of these cones meeting at the center of the rod at 33 so that in each instance the form of the metal rod 30 recedes from the center in each direction.

These rods 30 are constructed so as to fit one into each hole 20 formed in the supporting plate 10 and to be supported by the conical walls thereof, as shown. The products of combustion indicated by the arrows in the furnace portion A pass by and heat the upper ends of the conically shaped rods 30 consequently, the heat is conducted through the rod into the material W to be heated, and as the rods are conical in shape any incrustations formed thereon will drop down to the bottom of the tank under the rods as at 2, thus precluding the disastrous effects due to the formation of a continuous layer of incrustation on the furnace floor or wall against which the fire impinges.

By reason of the use of the conical shaped heating members, the salts and incrustations that form thereon will readily drop off by gravity, leaving the heating members at all times in good condition for transmitting the heat from the heating chambers to the material to be heated. It is particularly desirable to utilize metals for the formation of these heating rods or pins which are brittle, such as ferro-silicon. It is thus feasible in my apparatus to use an exceedingly brittle metal for the heat conducting members with a success that would be utterly unobtainable if the same metal was cast into a pipe and inserted in the tank to be heated by steam, because of the fact such pipe would break due to the unequal stresses which would be produced therein and also in the fitting.

The heating pins or rods 30 may be removed and reversed when the upper portions thereof are sufficiently destroyed by reason of the fact they are in direct contact with the products of combustion passing through the heating chamber. These reduced ends may then be inserted in the solution to be heated and the other ends, which are intact, may be placed in the heating chamber to be acted upon by the products of combustion.

As changes of construction could be made within the scope of my invention, it is intended that all matter contained in the above description or shown in the accompanying drawings shall be interpreted as illustrative and not in a limiting sense.

Having described the invention what I claim and desire to secure by Letters Patent is:

1. Apparatus of the type described which comprises a heating chamber, a chamber adapted to contain fluid beneath said heating chamber, a partition separating said chambers and heat conducting elements extending from said heating chamber through said partition into said fluid containing chamber.

2. Apparatus of the type described which comprises a heating chamber, a chamber adapted to contain fluid beneath said heating chamber, a partition separating said chambers and rods extending from said heating chamber through said partition into said fluid containing chamber.

3. Apparatus of the type described which comprises a heating chamber, a chamber adapted to contain fluid, a partition separating said chambers, said partition having spaced holes, and rods having conical surfaces fitting said holes.

4. Apparatus of the type described which comprises a combustion chamber, a chamber adapted to contain fluid beneath said combustion chamber, a partition separating said chambers, heat conducting elements extending from said heating chambers through said partition into said fluid containing chamber, and a fluid fuel burner in said combustion chamber.

5. Apparatus of the type described which comprises a combustion chamber, a chamber adapted to contain fluid beneath said combustion chamber, a partition separating said chambers, heat conducting elements extending from said heating chamber through said partition into said fluid containing chamber, a liquid inlet at one end of said fluid containing chamber, and a fluid fuel burner in said combustion chamber.

6. Apparatus of the type described which comprises a combustion chamber, a chamber adapted to contain liquid, a partition separating said chambers and heat conducting elements extending downwardly from said combustion chamber through said partition into said liquid chamber above the bottom of said chamber.

7. Apparatus of the type described which comprises, a chamber for a liquid to be heated, a heating chamber adjacent thereto, a partition plate therebetween and heat conducting elements extending downwardly from the heating chamber a sufficient distance to dip into liquid when contained in the liquid chamber for the purpose of heating the same.

8. Apparatus of the type described which comprises a combustion chamber, a chamber adapted to contain liquid, a partition separating said chambers above the normal level of liquid in said liquid chamber, and heat conducting elements extending from said combustion chamber through said partition sufficiently to dip into liquid when contained in the liquid chamber.

9. A method of heating liquids which comprises passing a heating fluid through a chamber out of direct heating relation to said liquid and transferring heat from said heating fluid to said liquid through heat conducting elements extending downwardly into said liquid.

10. Apparatus of the type described which comprises, an upper heating chamber, a lower chamber adapted to contain liquid, a partition separating said chambers, and reversible rods extending through said partition and having conical surfaces tapering from each side of said partition.

11. Apparatus of the type described which comprises, an upper heating chamber, a lower chamber adapted to contain liquid, a partition separating said chamber, reversible rods extending through said partition and having conical surfaces tapering from each side of said partition, and means for introducing liquids into said lower chamber and withdrawing liquids and vapors therefrom.

12. Apparatus of the type described which comprises, an upper heating chamber, a lower chamber adapted to contain liquid, a partition separating said chambers, reversible rods extending through said partition, and separate means for introducing liquids into said lower chamber and drawing liquids and vapors therefrom.

FRANK L. ANTISELL.